(12) United States Patent
Rits et al.

(10) Patent No.: US 7,904,710 B2
(45) Date of Patent: Mar. 8, 2011

(54) METHOD AND SYSTEM FOR PROVIDING A SECURE MESSAGE TRANSFER WITHIN A NETWORK SYSTEM

(75) Inventors: Maarten Rits, Nice (FR); Mohammed Ashiqur Rahaman, Nice (FR)

(73) Assignee: SAP AG, Walldorf (DE)

( * ) Notice: Subject to any disclaimer, the term of this patent is extended or adjusted under 35 U.S.C. 154(b) by 956 days.

(21) Appl. No.: 11/807,279

(22) Filed: May 25, 2007

(65) Prior Publication Data
US 2007/0277225 A1 Nov. 29, 2007

(30) Foreign Application Priority Data

May 26, 2006 (EP) .................................. 06290879

(51) Int. Cl.
*G06Q 20/00* (2006.01)
(52) U.S. Cl. ................... 713/150; 705/75; 726/1
(58) Field of Classification Search ............... 726/25
See application file for complete search history.

(56) References Cited

U.S. PATENT DOCUMENTS

| 7,529,793 | B2 * | 5/2009 | Itoh et al. ............ 709/203 |
| 2002/0040431 | A1 | 4/2002 | Kato et al. |
| 2004/0054912 | A1 | 3/2004 | Adent et al. |
| 2004/0139352 | A1 * | 7/2004 | Shewchuk et al. ........ 713/201 |
| 2006/0048210 | A1 * | 3/2006 | Hildre et al. ............ 726/1 |
| 2006/0213975 | A1 * | 9/2006 | Krishnan et al. ........ 235/380 |
| 2007/0022164 | A1 * | 1/2007 | Nog et al. ............ 709/206 |
| 2007/0169199 | A1 * | 7/2007 | Quinnell et al. .......... 726/25 |

FOREIGN PATENT DOCUMENTS

| EP | 1396978 A2 | 3/2004 |
| EP | 1596557 | 11/2005 |
| WO | WO/2005/076522 | 8/2005 |
| WO | WO/2006/022667 | 3/2006 |

OTHER PUBLICATIONS

Polivy et al., "Authenticating Distributed Data Using Web Services abd XML Signatures", Nov. 22, 2002, ACM, pp. 80-89.*
"Soap Version 1.2 Part 1: Messaging Framework", W3C Recommendation; http://www.archive.org/web/20060203023943/http://www.w3.org/TR/2003/REC-soap12-part1-20030624 (Jun. 24, 2003).
"Web Services Routing Protocol", WS-Routing http://web.archive.org/web/20051220143730/msdn.microsoft.com/library/en-us/dnglobspec/html/ws-routing.asp (Oct. 23, 2001).

(Continued)

*Primary Examiner* — Matthew B Smithers
(74) *Attorney, Agent, or Firm* — Brake Hughes Bellermann LLP

(57) ABSTRACT

Secure message transfer of at least one message from a sender to a receiver within a network system may be provided. For example, a message structure information regarding the at least one message may be computed on a sender-side and according to a pre-given scheme. The computed message structure information may be added as message account information into the at least one message to be sent. The message account information may be protected by a signature. The at least one message may be transferred through the network system to the receiver. On a receiver-side, the message account information may be validated after reception of the at least one message and according to the pre-given scheme.

28 Claims, 7 Drawing Sheets

OTHER PUBLICATIONS

"Samoa: Formal Tools for Securing Web Services", Microsoft Research; http://web.archive.org/web/20060112035006/http://research.microsoft.com/projects/Samoa/ (Jan. 12, 2006).

"Web Service Addressing" (WS-Addressing), W3C Member Submission 10; http://www.w3.org/Submission/2004/SUBM-ws-addressing-20040810/, (Aug. 10, 2004).

"Web Services Security: SOAP Message Security 1.0", (WS-Security 2004), Oasis Standard 200401; http://docs.oasis-open.org/wss/2004/01/oasis-200401-wss-soap-message-security-1.0.pdf, (Mar. 1, 2004).

"XML-Signature Syntax and Processing", W3C Recommendation, http://www.w3.org/TR/xmldsig-core/ (Feb. 12, 2002).

Bajaj, et al., "Web Services Policy Framework" (WS-Policy);http://www.ibm.com/developerworks/library/specification/ws-polfram/, (Sep. 2004).

Batres, et al., "Web Services Reliable Messaging Policy Assertion", (WS-RM Policy), (Feb. 2005).

Bhargavan, K., et al., "An Advisor for Web Services Security Policies", Proceedings of the ACM Workshop on Secure Web Services (Nov. 11, 2005).

Bhargavan, K., et al., "Verifying policy-based security for web services", 11th ACM Conference on Computer and Communications Security (CCS'04), pp. 268-277, (Oct. 2004).

Blanchet, B., "An efficient cryptographic protocol verifier based on Prolog rules", In Proceedings of the 14th IEEE Computer Security Foundations Workshop, pp. 82-96. IEEE Computer Society Press (2001).

Della-Libera, et al., "Web Services Security Policy Language", (WS-SecurityPolicy), (Jul. 2005).

Nadalin, T., et al., "Web Services Security Policy Language", (WS-Security Policy), v. 1.0, (Dec. 18, 2002).

Nadalin, T., et al. "Web Services Policy Assertions Language", (WS-PolicyAssertions; http://www.ibm.com/developerworks/library/ws-polas (May 28, 2003).

\* cited by examiner

```
<Envelope>                    110
  <Header>
    ............
    <Bogus>
      <MessageID Id = "Id-1">uuid:21c81 . . .</> </Bogus>
      <Security mustUnderstand = "1">
        <BinarySecurityToken ValueType = " . . .#X509v3"
          Id = "Id-2">MIIBxDCCAW6g . .
        <Signature>
          <SignedInfo>
            <CanonicalizationMethod Algorithm = " . . . xml-exc-
              c14n#"/>
            <SignatureMethod Algorithm = " . . . #rsa-sha1"/>
            <Reference URI = "#Id-1">                    104
              <DigestMethod Algorithm = " . . . #sha1"/>
              <DigestValue>d5A0d . . =</DigestValue>
            </Reference>
            <Reference URI = "#Id-3">
              <DigestMethod Algorithm = " . . . #sha1"/>
              <DigestValue>zSzZT . . . =</DigestValue>
            <Reference></SignedInfo>
            <SignatureValue>e4EyW . . . =</SignatureValue>
            <KeyInfo>
            <SecurityTokenReference> <Reference URI = "#Id-2"
              ValueType = " . . . #X509v3"/>
  <Body Id = "Id-3">

<StockQuoteRequest> . . . </StockQuoteRequest>
  </Body> </Envelope>
```

Figure 1b
PRIOR ART

```
<Envelope>
  <Header>
    ...............
    <Security>
      <UsernameToken Id=3>
        <Username>Alice</>
        <Nonce>cGxr8w2AnBUzuhLzDYDoVw = = </>
        <Created>2003-02-04T16:49:45Z</>
      <Signature>                                    ←————————506
        <SignedInfo>
          <Reference URI = #1><DigestValue>Ego0 . . .</>
          <Reference URI = #2><DigestValue>Qser99. . . </>
          <Reference URI = #3><DigestValue>OUytt0 . . .</>
        <SignatureValue>                                    504
          vSB9JU/Wr8ykpA1axCx2KdvjZcc=</>
      <KeyInfo>
        <SecurityTokenReference><Reference URI = #3/>
      <SOAPAccount id=2>  ←———— 505
        <NoChildOfEnvelope>2</>
        <NoOfHeader > 2 </>
      </SoapAccount>
<Body Id = 1>
  <TransferFunds>
    <beneficiary>Bob</>
    <amount>1000</>          510a
```

```
                                            502b
<Envelope>
  <Header>
    .............
    <Security>
      <UsernameToken Id=3>
        <Username>Alice</>
        <Nonce>cGxr8w2AnBUzuhLzDYDoVw = = </>
        <Created>2003-02-04T16:49:45Z</>
      <Signature>                                    ←─── 506

<SignedInfo>
          <Reference URI = #1><DigestValue>Ego0...</>
          <Reference URI = #2><DigestValue>Qser99....</>
          <Reference URI = #3><DigestValue>OUytt0...</>
        <SignatureValue>                             504
           vSB9JU/Wr8ykpA1axCx2KdvjZcc=</>
        <KeyInfo>
          <SecurityTokenReference><Reference URI = #3/>
      <SOAPAccount id = 2>  ←─── 505
        <NoChildOfEnvelope>2</>
        <NoOfHeader > 2 </>
      </SoapAccount>
      <Bogus Header>  ←─── 508
        <Body Id = 1>
          <TransferFunds>
            <beneficiary>Bob</>
            <amount>1000</>
<Body>
  <TransferFunds>
    <beneficiary>Bob</>
    <amount>5000</>      ←─── 510b
```

Figure 5b

METHOD AND SYSTEM FOR PROVIDING A SECURE MESSAGE TRANSFER WITHIN A NETWORK SYSTEM

CROSS-REFERENCE TO RELATED APPLICATION

This application claims priority under 35 U.S.C. §119 to European Patent Application EP06290879.3, filed May 26, 2006, titled "METHOD AND SYSTEM FOR PROVIDING A SECURE MESSAGE TRANSFER WITHIN A NETWORK SYSTEM," which is incorporated herein by reference in its entirety.

TECHNICAL FIELD

This description refers to the field of message transfer, particularly to message transfer security in network systems.

BACKGROUND

Regarding the current status of message level security in web services, various standards like web service security (WS-Security) along with web service policy (WS-Policy) play a central role. Although such standards are suitable for ensuring so-called end-to-end message level security as opposed to so-called point-to-point security, certain attacks may still occur.

Web service specifications have been designed with the aim of being composable to provide a rich set of tools for secure, reliable, and/or transacted web services. The so-called SOAP (simple object access protocol) is a possible way for a program running in one kind of operating system to communicate with a program in the same or another kind of an operating system by using the world wide web's hypertext transfer protocol (HTTP) and its extensible markup language (XML) as the mechanisms for information exchange. Since web protocols are installed and available for use on all major system platforms, HTTP and XML provide an already at-hand solution to the problem of how programs running under different operation systems in a network can communicate with each other. SOAP specifies exactly how to encode an HTTP header and an XML file, so that a program in one computer can call a program in another computer and deposit information. It also specifies how the called program can return response.

Due to the flexibility of SOAP-level security mechanisms, web services may be vulnerable to a distinct class of attacks based on a malicious interception, manipulation and transmission of SOAP messages, which may be referred to as XML rewriting attacks. The problem of XML rewriting attacks is described in detail, for example, in K. Bhargavan, C. Fournet, A. D. Gordon, and G. O'Shea, "An Advisor for Web Services Security Policies," Proceedings of the ACM Workshop on Secure Web Services, Nov. 11, 2005. Although the already mentioned web service security (WS-Security) and web service policy (WS-Policy) and other related standards theoretically can prevent XML rewriting attacks in practice, incorrect use of these standards may make web services vulnerable to XML rewriting attacks.

All web service specifications security related specifications, however, introduce new headers in SOAP messages. So concerns about the operational performance of web services security are legitimate because added XML security elements not only make use of more network bandwidth but also demand additional CPU (Central Processing Unit) cycles at both the sender side and the receiver side. Therefore, a generation and validation of a key security mechanism, e.g. signature, are always processor intensive tasks. Therefore, it is desirable to examine the performance issue of web services security.

Security protocols, described using web service specifications, are getting more complex day by day. Researchers are applying formal methods to verify and secure the protocols' and specifications' goals. As new vulnerabilities are exposed, these specifications continue to evolve.

The so-called Microsoft's SAMOA project represents an example effort where web services specifications are analyzed using rigorous formal techniques. One of the focus areas of the SAMOA project is to identify common security vulnerabilities during security reviews of web services with policy-driven security.

In the paper by Bhargavan, et al., referenced above, titled "An Advisor for Web Services Security Policies," the authors describe the design of an advisor for web services security configurations, the first tool both to identify such vulnerabilities automatically and to offer remedial advice. While one of their previous works, which is described in K. Bhargavan, C. Fournet, and A. D. Gordon, "Verifying policy-based security for web services," $11^{th}$ ACM Conference on Computer and Communications Security (CCS '04), pages 268-277, October 2004," may be used to generate and analyze web services security policies to be aware for vulnerabilities to XML rewriting attacks, this tool is able to bridge the gap between formal analysis and implementation. Moreover, the just-referenced paper describes a formal semantics for web service security policy (WS-Security Policy) and proposes an abstract link language (described in K. Bhargavan, C. Fournet, A. D. Gordon, and R. Pucella, "TulaFale: A security tool for web services," International Symposium on Formal Methods for Components and Objects (FMCO '03), LNCS. Springer, 2004") for specifying the security goals of web services and their clients. They present the architecture and implementation of fully automatic tools to compile policy files from link specifications and to verify by evoking a theorem prover (described, for example, in B. Blanchet, "An efficient cryptographic protocol verifier based on Prolog rules. In Proceedings of the $14^{th}$ IEEE Computer Security Foundations Workshop, pages 82-96. IEEE Computer Society Press, 2001") whether a set of policy files run by any number of senders and receivers correctly implements the goals of a link specification, in spite of active attackers.

Note that policy-driven web services implementations are prone to the useful subtle vulnerabilities associated with cryptographic protocols. These tools help prevent such vulnerabilities, as policies can be verified when first compiled from link specifications, and also can be re-verified against their original goals after any modifications during deployment.

The assumptions with all these formalizations are that the attacker can compose messages, replay them, or decipher them only if it knows the right key, but cannot otherwise decrypt the encrypted messages. These formalizations do not model insider attacks; in fact principals with shared keys are assumed well-behaved.

Web service security specification(s) are available that may be used to define an end-to-end security framework that provides support for intermediary security processing. Message integrity may be provided by using known XML signature(s) in conjunction with security tokens to ensure that messages are transmitted without modifications. Message confidentiality is granted by using XML encryption in conjunction with security tokens to keep portions of SOAP messages confidential. Web service security seeks to encapsulate the security interactions described above within a set of security headers.

Web service policy is essentially a logical predicate on SOAP messages over base assertions, determining which message parts must be present, signed or encrypted. A standard policy framework would make it possible for developers to express the policies of services in a machine-readable way. Web services infrastructure could be enhanced to understand certain policies and enforce them at runtime. The policy framework currently expressed by web service policy (WS-Policy) requires the definition of policy "Assertions" (predicates) for each domain to which policy is to be applied.

Three examples of specifications defining such assertions have been published hitherto:

1. "WS-PolicyAssertions" (described in T. Nadalin, et al., "WS-PolicyAssertions, 28 May 2003) defining some general-purpose assertions, 2. "WS-SecurityPolicy" (described in T. Nadalin, et al., "Web Services Security Policy Language (WS-Security-Policy), Version 1.0, 18 Dec. 2002"), defining policy assertions for web service security and other specifications that might cover the same message security space, and 3. "WS-ReliabilityPolicy" (described in Stefan Batres, et al., "Web Services Reliable Messaging Policy Assertion (WS-RM Policy)", February 2005), defining policy assertions for web service reliability, and other specifications that might cover the same reliable messaging space.

WS-SecurityPolicy1.0 may be built on the WS-Policy (WS-Policy as described in Bajaj, et al., "Web Services Policy Framework (WS-Policy)," September 2004) and WS-PolicyAssertion is a declarative XML format for programming how web services implementations construct and check web service security headers. It expresses policy in terms of individual headers on individual messages. It defines two base assertions for integrity and confidentiality. The more recent version WS-SecurityPolicy1.1 expresses policy in terms of higher-level message patterns.

XML digital signatures specification may generally specify how to describe, attach, and validate a digital signature using XML. The "Signature" element is the primary construct of the XML digital signature specification. The signature is generated from a hash over the canonical form of the manifest, which can reference multiple XML documents. Canonicalization means to put a structure in a standard format that is generally used. The "SignedInfo" element is the manifest that is actually signed. This data is sequentially processed through several steps on the way to becoming signed.

XML canonical forms states that XML documents though being logically equivalent within an application context may differ in physical representations based on XML permissible syntactic changes. These changes, for example, can be attribute ordering, entity references or character encoding. Basically this is a process of applying standard algorithms to generate a physical representation of an XML document. In XML security, there is a standard mechanism to produce an identical input to digestion procedure prior to both signature generation and signature verification. Given its necessity, the speed of canonicalization will have an impact on the overall performance of SOAP security.

Considering the above described state of the art, various web service specifications as described in G. Della-Libera, M. Gudgin, P. Hallam-Baker, M. Hondo, H. Granqvist, C. Kaler, H. Maruyama, M. McIntosh, A. Nadalin, N. Nagaratnam, R. Philpott, H. Prafullchandra, J. Shewchuk, D. Walter, and R. Zolfonoon, "Web services security policy language (WS-SecurityPolicy), July 2005. However, a number of limitations to their applicability in secure web services can be identified.

Since all the proposed standards are only frameworks, they do not mandate any guarantee that using WS-security provides the absolute security; rather if used incorrectly web services would be vulnerable to XML rewriting attacks.

It seems not to be realistic to capture all security needs within a simple declarative syntax. In order to handle each assertion, a policy processor must incorporate a domain-specific code module that understands the interpretation of that assertion as defined in a domain-specific specification. The interpretation is subject to human error, so without strict conformance tests, different implementations of a processor for each assertion may not be consistent.

Policy files need to be validated on application start-up, because if a policy file is compromised then malicious SOAP messages could be transported.

Enforcing a policy is totally domain dependent and it is a must. The strongest policy may be useless if it is not applied to the right message. An enforcement of the policy for intermediaries is yet to be standardized. Furthermore, there is a lack of standardization to retrieve policy for sender or receiver.

The digital signature references message parts by their Id attributes (Identity attributes), but says nothing of their location in the corresponding message. So an attacker can rewrite the message part placing it in a new header keeping the reference valid.

The message identifier is optional according to WS-Addressing as described in "Web Service Addressing (WS-Addressing) W3C Member Submission 10 Aug. 2004," but is generally included in a request if a reply is expected. All the above mentioned limitations may directly affect the security and the performance of the web services.

The presence of a hostile opponent who can observe all the network traffic and is able to send any fraudulent messages meeting the protocol requirements must always be assumed. So the already mentioned SOAP messages, for example, are vulnerable to a distinct class of attacks by an attacker placed in between any two legitimate SOAP nodes, e.g. sender, intermediaries and ultimate receiver. The attacker intercepts the message, manipulates it and may transmit it. These kinds of attacks are called XML rewriting attacks and are described in detail herein reference. It can be stated that XML rewriting attacks follow two patterns in general. The patterns give indication about a security loophole.

The first pattern can be called SOAP Extensibility Exploitation. In this case the attacker generates new SOAP elements and adds those into the corresponding message, keeping it well formed. Consequently malicious data may be transported.

The second pattern can be described as "Copy & Paste". In this case, the attacker copies parts of a message into other parts of that message or into completely new messages, which may be generated using the previous pattern.

The attacker is able to forge message parts and tricks a recipient in a way, that it is impossible to detect any tampering if the standards, e.g. WS-Security, WS-Policy, WS-SecurityPolicy, are not used carefully. An important observation here is that not the cryptographic technique used as part of the standard has been broken but that the SOAP message structure has been exploited by an attacker. As already mentioned above, the digital signature references message parts by their Id attributes but says nothing of their location in the message. So an attacker can rewrite the message part placing it in a new header keeping the reference valid.

Methodical usage of WS-Policy, WS-PolicyAssertion, and WS-SecurityPolicy resists these attacks, however, such methodical usage may be difficult to implement in a consistent, practical, reliable way.

SUMMARY

Against the background of the cited prior art it would be desirable to find a possibility, which allows to detect some attacks early in a validation process of a transferred message with an improved performance.

According to one aspect, a method is provided for providing a secure message transfer of at least one message from a sender to a receiver within a network system, wherein the method comprises at least the operations of computing on sender-side according to a pre-given scheme a message structure information regarding the at least one message to be sent, adding the computed message structure information as message account information into the at least one message to be sent, protecting the message account information by a signature, and transferring the at least one message through the network system to the receiver for validation of the message account information upon receipt of the at least one message according to the pre-given scheme.

According to another aspect, a method is provided for providing a secure message transfer of at least one message from a sender to a receiver within a network system, the method comprising at least the operations of receiving on receiver-side the at least one message which comprises a message account information, the message account information having been computed on sender-side according to a pre-given scheme and protected by a signature, and validating on receiver-side the message account information after reception of the at least one message according to the pre-given scheme.

According to a further aspect, a network system comprises at least one sender node and at least one receiver node and provides a secure message transfer of at least one message from the sender node to the receiver node, wherein the at least one sender node comprises an adding module which is configured to compute a message structure information regarding the at least one message to be sent according to a pre-given scheme, an dto add the computed message structure information as message account information into the at least one message and to sign the message account information by a signature before transferring the at least one message to the receiver node. The receiver node comprises a checking module which is configured to validate the message account information immediately after reception of the at least one message with respect to the pre-given scheme.

Implementations may include that the pre-given scheme cause to include on sender-side message structure information in outgoing messages and validate this message structure information on receiver-side before policy-driven validation. This allows detection of some attacks early in a validation process.

It is possible that the at least one message is chosen as a SOAP message. However, other examples exist, such as, for example, any structured message format containing metadata that can be applied in a so-called multi-hop scenario, i.e. that is forwarded between different intermediaries before reaching its target. As already described above, a SOAP message is a message created by using a specific protocol, namely the so-called Simple Object Access Protocol (SOAP). SOAP is a way for a program running in one kind of operating system to communicate with a program in the same or another kind of an operating system by using the hypertext transfer protocol (HTTP) and its extensible markup language (XML) as the mechanisms for information exchange. With respect to the specifications of WS-Security, WS-Policy, WS-SecurityPolicy and the above discussion referring to the state of the art, it can be stated that a large number of SOAP extensions is possible. The SOAP header information never considers for example the SOAP message structure, which can be essentially the major attack point. By including SOAP structure information in the SOAP message the above mentioned XML rewriting attacks can be detected early in a following validation process at the receiver-side.

According to a possible embodiment of the method according one aspect, validating of the message account information comprises computing, according to the pre-given scheme, the message account information of the received message and comparing it with the obtained message account information as provided within the received message.

Implementations may include one or more of the following. For example, it is possible that the received message is rejected if any mismatch is detected between the computed and the included message account information of the received message. The method may include that validating of the message account information comprises validating the signature of the message account information of the received message.

It is possible that the message account information is added in a message element of the at least one message to be sent. Each message generally comprises at least one header and body. The message structure information can be integrated easily, while adding the header, for example. Thereby, it is possible to pass message account information about the exchanged message in a domain independent fashion.

Furthermore, the at least one message to be sent is protected while it is processed by a node such that it can be updated legitimately by an intermediary if it is required to do so. Any tampering with pre-existing message parts by the compromising node can be detected early by the receiver before committing its resources to validate and to process the message.

The integrity features of a message may now be protected from malicious attackers while in transit. A SOAP message, for example, may choose its next hop dynamically, and its required message parts may be secured dynamically based on any requirements of a possible intermediary.

After carefully observing rewriting attacks the following conclusions may be drawn. For example, such attacks may include some kind of a modification of a message, e.g. a SOAP message. This modification may include either deleting some parts and adding more afterwards, or adding some completely new element in a SOAP message, essentially in a header portion or in a body. When some unexpected modification occurs in the form of manipulation of underlying XML elements, an intended predecessor or successor relationship of the corresponding SOAP element is lost consequently. The number of predecessor, successors and sibling elements of a SOAP element where the unexpected modification occurs is changed and thus the expected hierarchy of the corresponding element is modified as well.

Thus, at the time of sending a SOAP message, it is possible to always keep an account of the SOAP elements by including, according to one aspect, a message structure information into the message. It is possible that the computing of the message structure information is performed while creating the at least one message to be sent.

The message structure information that is computed may include determining at least one of the following items: a number of child elements of a root element, e.g. an envelope, within the at least one message; a number of header elements within the at least one message; a number of references for a signed element within the at least one message; or predecessor, successor and sibling relationship of a signed element.

Such message structure information may be, as already mentioned, computed while the message to be sent is created in the sender. Therefore, no considerable overheads are incurred for the computation. Since this message structure information is computed by creating the same message, this method can be described as an inline approach.

On the sender-side a protocol stack generates an envelope, e.g. a SOAP envelope that satisfies its policy and then a message structure information is added into the outgoing message, e.g. the outgoing SOAP message. The sender may sign the message structure information. Conversely, on the receiver-side, a message envelope, e.g. a SOAP envelope, is accepted as valid (and subsequently passed to an appropriate application), if its message structure information is validated and then policy is satisfied for this envelope. Validating message structure information before validating policy enables to detect rewriting attacks in a first phase, and thus limits or eliminates a need to perform intensive policy-driven validation, which may not detect attacks at all if not used carefully.

It is also possible that the receiver of the at least one message is updating the at least one message, thus forming at least one updated message and acting as the sender for the at least one updated message. That means that the at least one message can be updated by at least one intermediary, which acts as receiver for the at least one message and as a sender for the at least one updated message. Thereby, a message can be protected while it is processed by a network node such that it can be updated legitimately by such an intermediary if it is required to do so.

According to still a further embodiment of the method the signature is realized by an encryption mechanism. It is also possible, as already indicated, that the at least one message is created using XML format. According to still a further implementation of the method, the message transfer of the at least one message is based on Java.

In the following, example implementations of the method(s) is/are described in detail, using an example of a SOAP message as the at least one message to be sent. The SOAP message structure is captured by using a SOAP processor. Using this structure information enables to detect the attacks in the described scenarios.

In the following, implementations of the method(s) is/are described by means of a simple example. The case described here refers to a transfer of an already-mentioned SOAP message comprising a SOAP header and a SOAP body. Before further describing the single steps being performed according to the described embodiments of the methods, there are given two concrete examples and two errors that lead to typical XML rewriting attacks.

Within a first example scenario it is possible that one service consumer of, for example, a stock quote service requests for some particular stock. Each request causes the consumer to pay. It is assumed here, that one SOAP node, e.g. an ultimate receiver, is supposed to process the SOAP header or body. This may be done, for example, according to a known SOAP specification, using known routing techniques, such as, for example, WS-Routing. In such examples, the so called <Security> header block, without a specified actor, may be consumed by any recipient, but should not be removed prior to the final destination.

Consequently, an attacker may observe and manipulate the message on the SOAP path, i.e. during the transfer of the SOAP message. The attacker may move an element, e.g. a message ID, into a new, false header, e.g. a so-called <Bogus> element. Everything else, including the certificate and signature, remains the same. The <Bogus> element and its contents are ignored by the receiver since this header is unknown, but the signature is still acceptable because the element at the respective reference remains in the message and still has the same value. This may cause the consumer to pay several times for the same request and forces the service to do redundant work, as described in more detail, below.

In a second scenario, a customer may submit an order that contains an orderID header, using, e.g., a mobile device. In the example, the customer signs the orderID header and the corresponding body of the order, i.e. the contents of the order. When this is received by an order processing sub-system or an intermediary, the sub-system or intermediary may insert a so-called shippingID into the header. The order sub-system would then sign, at a minimum, the orderID and the shippingID, and possibly the body as well. Then, when this order is processed and shipped by the shipping department, a so-called shippedInfo header might be appended. The shipping department may sign the shippedInfo and the shippingID, and possibly the body, and forward the message to a billing department for processing. The billing department may verify the signatures and determine a valid chain of trust for the order, as well as which party performed which action. However, as referenced, an attacker with access to any SOAP node may be able to copy and paste an order ID in a <bogus> header, which may be designed to cause the order processing system to process the same order several times. For example, the attacker may copy and paste the body of the message under a new fake header and may insert arbitrary order information to be processed subsequently.

Continuing with this example, in an example implementation, SOAP message structure information may be calculated before sending any SOAP message. This calculated message structure information may be added in a SOAP message element, e.g., in a corresponding header or in a corresponding body, and then may be signed. The same arguments are applicable for possible intermediaries as well. To understand it rigorously the second scenario is taken and the following notation is used for the following exemplary description. For example, encryption of a plaintext m into a ciphertext is written as $C=\{m\}_K$, where K is a key being used. The digital signature may be written as an encryption $\{m\}_{S^{-1}}$ with a private signing key $S^{-1}$. When a sender A sends some message m to a receiver B, this is noted as A=>B:m. A=>B: $\{m\}_{S^{-1}}$ is written when m is sent with a signature. A signed object pattern (SOP) is defined which manifests the signed elements in a message one intends to sign. The signed object pattern $SOP_A$ of sender A corresponds to $\{SOAP\ Account_A+OrderID+Body\}$ where SOAP $Account_A$ refers to the SOAP Account of A, i.e. to the message structure information of the message m. A signs its signed object pattern before sending it to person B:A=>B:R, $\{SOAP\ Account_A+OrderID+Body\}_A^{-1}$, where R is the rest part of the message.

B acting as intermediary, processes the order and adds a new header ShippingID, and B's signed object pattern ($SOP_B$) which is $\{I_1+SOAP\ Account_B+ShippingID+Body\}$ where a SOAP $Account_B$ refers to the SOAP account of B, i.e. to the message structure information of the message processed by B.

B sends this message further to a person C which can be written as: B=>C:R, $\{I_1+SOAP\ Account_B+ShippingID+Body\}_B^{-1}$, where $I_1$ is the signature of A's signed object pattern. C may process the message and add a new header ShippingInfo, and C's signed object pattern ($SOP_C$) which is written $\{I_2+SOAP\ Account_C+ShippingID+ShippingInfo+

Body}, where SOAP Account$_C$ refers to the SOAP Account of C, i.e. to the message structure information of the message processed by C.

C can send this message further to a person D which can be notified as follows: C=>D:R, {I$_2$+SOAP Account$_C$+ShippingID+ShippingInfo+Body}$_C^{-1}$. Finally D receives: R, {{{SOP$_A$}$_A^{-1}$+{SOP$_B$}}$_B^{-1}$+{SOP$_C$}}$_C^{-1}$. D, as an ultimate receiver, may validate the message structure information successively, thus starting with SOAP Account$_C$ as C is the outermost signature. Having a nested signature, D can validate each signature subsequently using each public certificate respectively.

It should be noted that in some example implementations, all SOAP Account information may also be well protected by a signature, which makes it impossible to change by any malicious host. If any kind of XML rewriting attacks appears in the message in the form of the mentioned scenarios, it will be caught immediately by the receiver during a validation process. This may be performed in a straightforward manner, since each attack in a received SOAP message essentially invalidates the SOAP Account information that is bundled in the same SOAP message.

The deletion of headers and further message elements can be detected without restricting the flexible XML format. Deletion is a stronger form of a rewriting attack. In order to prevent this with the policy approach according to the prior art described at the beginning every header and element should be declared as mandatory. However, such declaration(s) may introduce a performance penalty in the validation phase, and may strongly reduce the flexibility of the XML message format, since only message elements that were defined in advance by the partners could be added. With example implementations described herein, the different intermediaries have additional some flexibility to add additional information, which can be detected for deletion/rewriting by the subsequent parties.

As already mentioned above, one aspect refers to a network system comprising at least one sender node and at least one receiver node and providing a secure message transfer of at least one message from the sender node to the receiver-node. It is possible according to example embodiments of the system that the system comprises at least one network node including both one of said adding module and one of said checking module, thus consolidating one of said sender node and one of that receiver node within one single network node. Such a network node can act as an intermediary, which can process a message on its path from a sender node to an ultimate receiver node within the network system. Such an intermediary can process and therefore update a message on its way through the network system. Because of the presence of such an adding module and such a checking module within the intermediary, the intermediary is able to guarantee a secure message transfer through the network system, even if this corresponding message is processed and updated within the intermediary.

In a further example embodiments, the checking module may be configured to compute, according to the pre-given scheme, the message account information of a received message and to compare that computed message account information with the obtained message account information as encompassed within the received message. It is also possible that the receiver node can conclude that a received message is not acceptable if any mismatch is detected between the computed and the included message account information of the received message. Furthermore, it is possible that the receiver node can initiate automatically a specific action if the received message is determined to be unacceptable. For example, such an action may correspond to a rejection of the corresponding message and emission of a warning signal or a rejection of the message coupled with an emission of a warning signal. Quite a number of further possible actions can be initiated in such a case. Furthermore, it is possible that the checking module is configured to validate the signature of the message account information of the received message.

Further example embodiments envisage that the adding module may add the message account information in a message element of the at least one message to be sent and sign that message element, wherein that message element can be chosen as one of the group consisting of a message header and a message body. It is possible that the adding module and/or the checking module are based on Java. Furthermore, the adding module and/or the checking module can be compiled and used for Microsoft windows running on a personal computer. Generally, it is possible that the adding module and/or the checking module can be compiled and used for any computing system supporting Java such as Microsoft Windows, Linux, Unix.

As mentioned above, the receiver node of the at least one message can update the at least one message, thus forming at least one updated message and acting as the sender node for the at least one updated message.

The at least one message can be chosen as an already mentioned so-called SOAP message. According to still a further embodiment of the system, the message structure information to be computed and to be validated, may include at least one of the following items: a number of child elements of a root element within the at least one message; a number of header elements within the at least one message; a number of references for a signed element within the at least one message; and a predecessor, successor and sibling relationship of a signed element.

The signature may be realised by an encryption mechanism. Furthermore, it is possible that the at least one message is written in XML format.

In general, in another aspect, a computer program product with a computer-readable medium and a computer program stored on the computer-readable medium with a program code may be provided, which is suitable for carrying out a method according to any implementation when the computer program is run on a computer.

One further aspect also refers to a computer program with a program code, which is suitable for carrying out a method according to any implementation and a computer-readable medium with a computer program stored thereon, the computer program comprising a program code, which is suitable for carrying out a method according to any implementation when the computer program is run on a computer.

Further features and embodiments will become apparent from the description and the accompanied drawings. For purposes of clarity, the present discussion refers to an abstract example of a computer system. However, it will be appreciated that the method and the system of any implementation may operate with a wide variety of types of network systems, including networks and communication systems dramatically different from the specific example as illustrated in the following drawings. Further, it should be understood that while one or more implementations are described in terms of one or more specific systems, further implementations may have applications in a variety of communication systems, such as advanced cable-television-systems, advanced telephone-networks or any other communication system that would benefit from the system or the method according to any aspect. It is intended, then, that the system as used in this specification and claims is suitable for any such communication system(s).

One or more implementations are schematically illustrated in the drawings by way of an example embodiment and explained in detail with reference to the drawings. It is understood, that the description is in no way limiting and is merely an illustration of various implementations.

BRIEF DESCRIPTION OF THE DRAWINGS

FIG. 1b shows the message of FIG. 1a after a XML rewriting attack on an exemplary SOAP message as it is known from the prior art.

FIG. 5a shows a possible message to be transferred within an embodiment of a system according to an implementation, before an attack.

FIG. 5b shows the message of FIG. 5a after an attempt to attack.

DETAILED DESCRIPTION

Figure 1A:
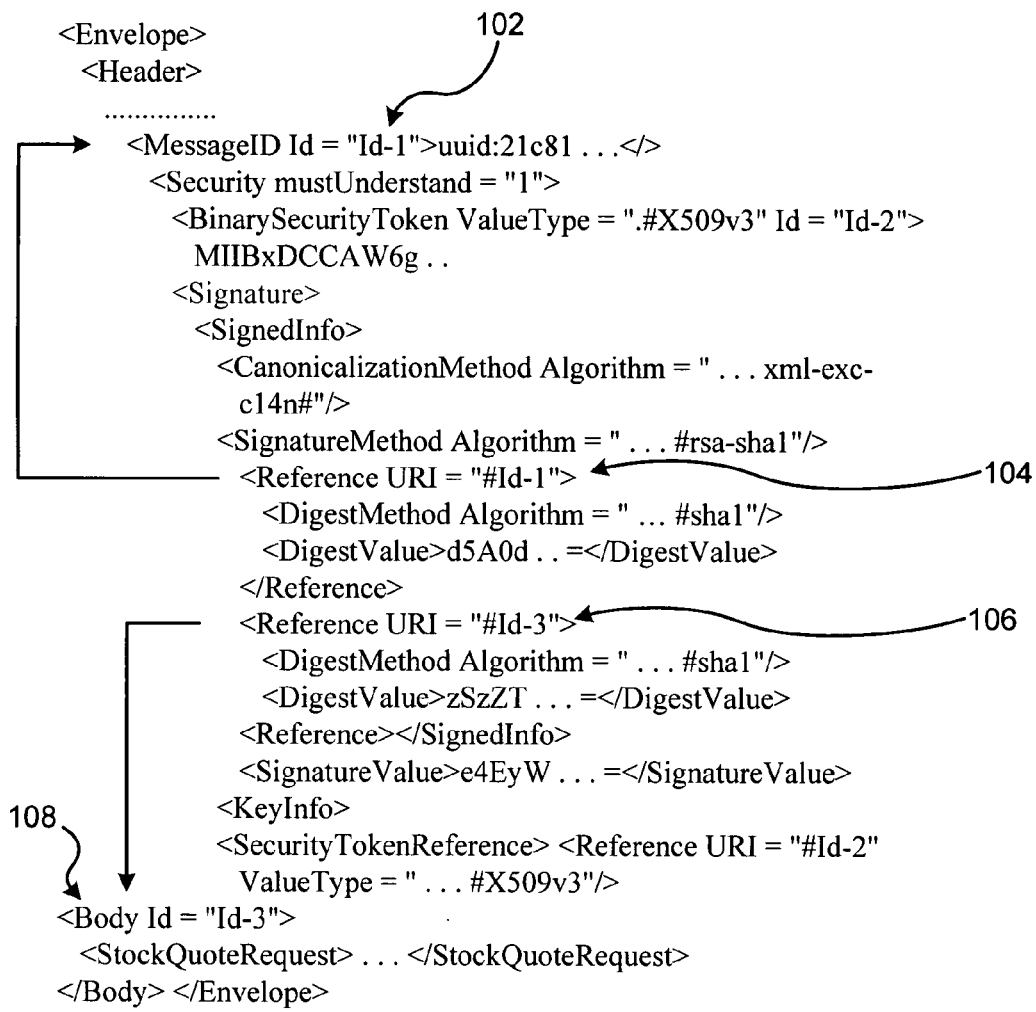
FIG. 1a shows a possible scenario of a SOAP message before an attack.

FIG. 1a shows an excerpt of a SOAP message as it can be sent by a sender, i.e. a specific requester. In the case shown here, there is considered a service consumer of a stock quote service which requests for some particular stock. Each request causes the consumer to pay. It is assumed in this case, that one network node as an ultimate receiver is supposed to process a SOAP header or body of the SOAP message. This is done according to the already-mentioned SOAP specification and WS-Routing.

As shown, the header comprises a message ID 102, which is necessary to correlate a message reply. The message ID 102 is signed as shown at line 104, i.e., <Reference URI="#Id-1">. The body also comprises a body ID 108, i.e., <Body Id="Id-3">. The header contains a signature for the body as indicated at line 106, i.e., <Reference URI="#Id-3"> for the body, which is signed for integrity.

This security header block of FIG. 1a, without a specified actor, can be consumed by anyone, but must not be removed prior to a final destination. It is possible that an attacker can now observe and manipulate the message on the SOAP message path. the attacker may, for example, move an element, such as the message ID 102, into a new false header, as for example in a so-called <Bogus> element 110, as shown in FIG. 1b. Everything else, including the certificate and signature remains the same. The inserted bogus element 110 and its contents are ignored by the receiver since this header is unknown, but the signature is still acceptable because the element 104, i.e., at reference URI "#Id-1," remains in the message and has still the same value.

This may cause the consumer to pay several times for the same request and forces the service to do redundant work.

Figure 2:
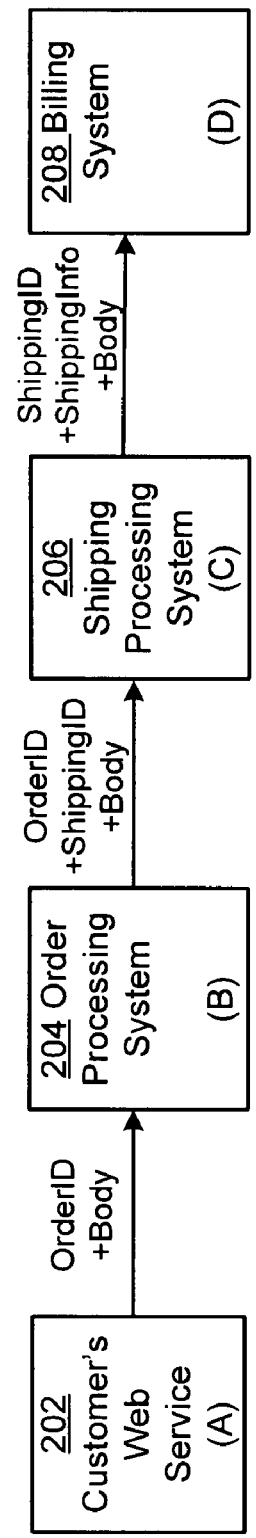
FIG. 2 shows a further possible scenario of a message transfer, which may be vulnerable to a XML rewriting attack as it is known from the prior art.

FIG. 2 shows a further possible scenario of a message transfer through a network system. A customer uses his mobile service A 202, e.g., on a mobile device, in order to submit an order containing an order ID header and an order body. The customer signs the order ID header and the body of the order, the body containing the contents of the order. The thus-signed order is transferred through the network system to an order processing system B 204, as an example of an intermediary node. The order processing system B 204 may insert a shipping ID into the header of the received order, as shown. The order processing system B 204 may then sign the order ID and the shipping ID and possibly also the body. Then the message is further transferred to a shipping processing system C 206. The shipping processing system C 206 processes and ships the order. A shipped info header might be appended by the shipping processing system C 206. The shipping processing system C 206 would sign the shipped info and the shipping ID and possible the body, and forward the message to the billing system D 208 for further processing. The billing system D 208 can verify the signatures and determine a valid chain of trust for the order, as well as who did what.

An attacker with access to any SOAP node (e.g., the nodes 202-208) may be capable of copying and pasting the order ID in an already mentioned bogus header, which causes the complete order processing system to process the same order several times. The attacker can copy and paste the body of the message under a new fake header and may insert arbitrary order information to be processed subsequently.

Figure 3:
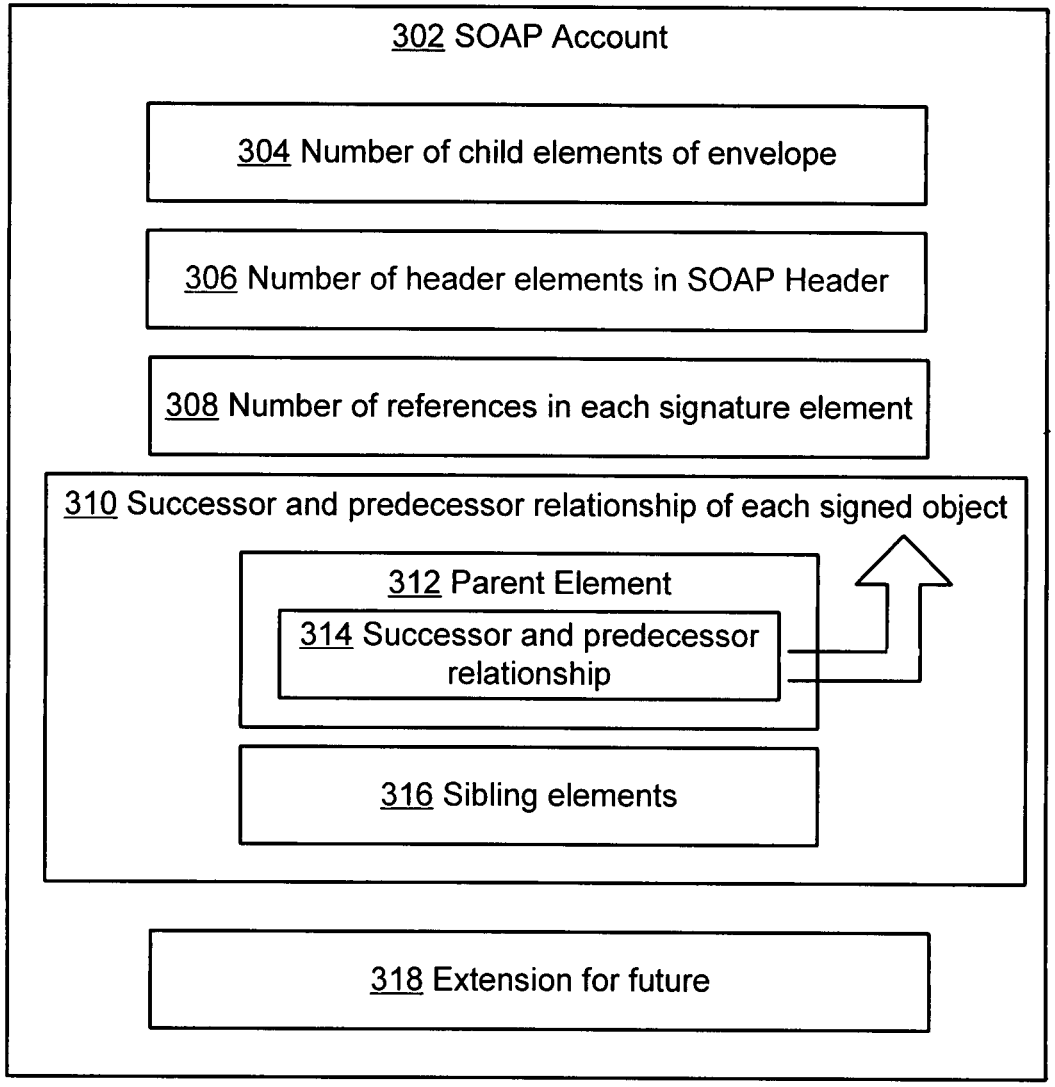
FIG. 3 shows a possible message structure information as it can be computed, added and afterwards validated according to a possible embodiment of the method according to one aspect.

FIG. 3 depicts an example of a message structure information as it can be computed and subsequently added to a corresponding message as proposed by example embodiments of the methods described herein. The message for which the message structure information has to be computed, for example, may be a SOAP message. The SOAP message structure information can further be computed using any so-called SOAP processor. At the time of sending such a SOAP message, the SOAP message structure information is first included into the message. The SOAP message structure information can be computed while the message itself is generated in a corresponding sender. The sender provides an adding module (an example of which is shown in FIG. 4 as an adding module 404), which is configured to compute the respective message structure information and to add the computed message structure information to the message, particularly into any usable message element, as for example into a header or a body of the respective message.

As shown in FIG. 3, the message structure information may be expressed in a SOAP account 302, and may include, for example, a number 303 of child elements of a root element such as an envelope, a number 306 of header elements in the (SOAP) message header, a number (308) of references in each signature element, and successor and predecessor relationship(s) 310 of each signed object, which may include a parent element 312 (and successor and predecessor relationships 314 and sibling elements 316). On the sender side, a message envelope is generated by a protocol stack that satisfies its policy and then the computed message structure information is added into the outgoing message. The sender must sign the message structure information.

Conversely, on a receiver side, a message envelope is accepted as valid and passed to an appropriate application if its message structure information is validated at first and then policy is satisfied for this envelope. Validating message structure information before validating policy makes it possible to detect a rewriting attack in the first phase and thus without doing processing intensive policy driven validation, which may not detect attacks at all if not used carefully. Using the message structure information enables the system to detect the attacks in the previously described scenarios as described with respect to FIGS. 1a, 1b, and 2. The indicated extension element 318 is provided to include any future extension.

Figure 4:
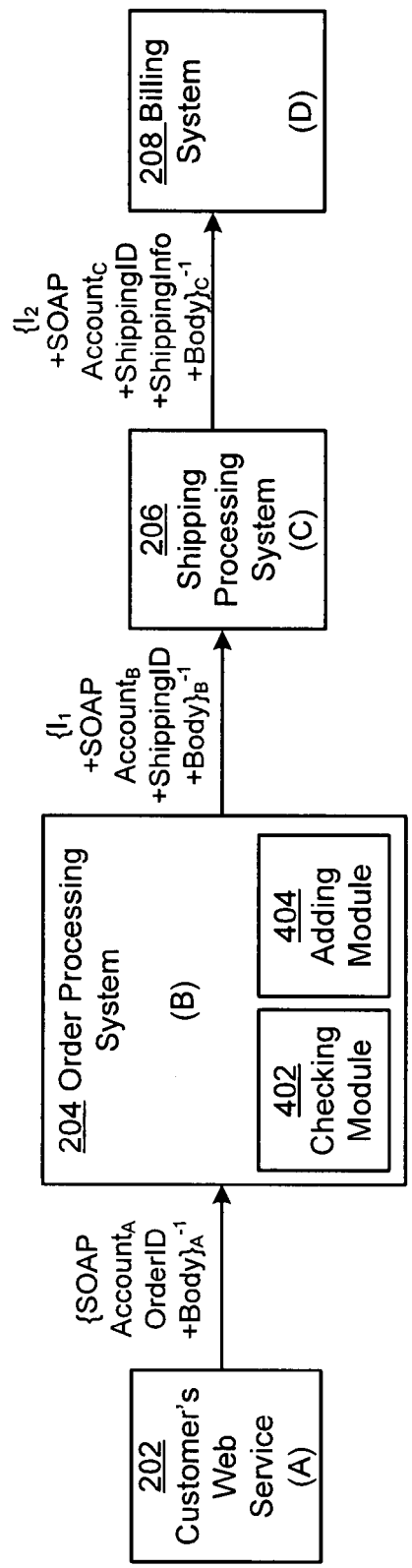
FIG. 4 shows a possible transfer of a message within an embodiment of the system according to another aspect.

FIG. 4 shows a possible scenario of a message transfer with multiple intermediaries within an embodiment of a network system according to one possible implementation.

With respect to FIG. 4 an encryption of a plaintext m into a hypertext is written as $C=\{m\}_K$, where K is a key being used. A digital signature is written as encryption $\{m\}_S^{-1}$ with a private signing key $S^{-1}$.

When a sender A 202 sends some message m to a order processing system B 204 it is to be noted as A=>B:m. It is written as A=>B:$\{m\}_S^{-1}$ when m is sent with a signature. A concatenation of $m_1$ and $m_2$ is written as $m_1+m_2$.

A signed object pattern (SOP) which manifests signed elements in a message one intends to sign are also defined. The signed object pattern ($SOP_A$) of sender A is={SOAP Account$_A$+OrderID+Body}, where SOAP Account$_A$ refers to a message structure information of the SOAP message sent by sender A 202. The sender A 202 signs its signed object pattern before sending the SOAP message, to order processing system B 204, which is written as follows: A=>B:R, {SOAP Account$_A$+OrderID+Body}$_A^{-1}$, where R is the rest part of the corresponding SOAP message.

The order processing system B 204 processes the order and adds new header shippingID and the signed object pattern $SOP_B$ of the order processing system B, which corresponds to {$I_1$+SOAP Account$_B$+ShippingID+Body}, where SOAP Account$_B$ refers to a message structure information of B 204.

The order processing system B 204 sends this updated order to a shipping processing system C 206, which is written as follows: B=>C:R, {$I_1$+SOAP Account$_B$+ShippingID+Body}$_B^{-1}$, where $I_1$ is the signature of the signed object pattern of the sender A.

The shipping processing system C 206 processes the order and adds new header shipping info and C's signed object pattern ($SOP_C$) is {$I_2$+SOAP Account$_C$+ShippingID+ShippingInfo+Body}, where SOAP Account$_C$ refers to the message structure information of C.

The shipping processing system C 206 sends the processed order, to a billing system D 208, which is described as follows: C=>D:R, {$I_2$+SOAP Account$_C$+ShippingID+ShippingInfo+Body}$_C^{-1}$, where $I_2$ is the signature of B's signed object pattern.

Finally the billing system D 208 receives: R, {{{SOP$_A$}$_A^{-1}$+{$SOP_B$}}$_B^{-1}$+{$SOP_C$}}$_C^{-1}$. The billing system D 208 will validate SOAP Account$_C$ using a checking module (not shown in FIG. 4, but analogous to the checking module 402 of the order processing system B 204), which is provided by the billing system D 208 in its role as a receiver. The billing system D 208 uses SOAP Account$_C$ as C is the outermost signature it needs to validate. Having a nested signature, the billing system D 208 can validate each signature subsequently using each public certificate, respectively. Note, that all message structure information is also well protected by a signature, which makes it impossible to change by any malicious host. Thus, for example, if any kind of XML rewriting attacks appears in the message in the form of the mentioned scenarios as described with respect to FIGS. 1a, 1b, and 2, it will be caught immediately by the checking module provided by the billing system D 208. This is straightforward as each attack in a received message, such as a received SOAP message, essentially invalidates the message structure information that is bundled in the same message. Thus, for example, the deletion of headers and elements of a message can be detected without restricting the flexible XML format.

In FIGS. 5a and 5b, a scenario is illustrated in which only one message structure information written as SOAP account is attached with a requester's SOAP message, and no intermediaries are supposed to update it. In the examples, a customer, Alice, requests 1000 euros to be transferred from her account to a suppliers account. The supplier is called here Bob. Some malicious attacker intercepts this message and updates it stating to transfer 5000 euros instead of 1000 euros.

FIG. 5a depicts the outgoing message 502a after adding the message structure information, called here SOAP account information 505. Using an adding module (such as the adding module 404) provided on sender-side, any message structure information about the outgoing message can be calculated as indicated in FIG. 5a. In FIG. 5a and similar implementations, the SOAP account information 505, may include, for example, that a number of children of envelope is 2, a number of headers is 2, a number of signed elements is 3, an immediate predecessor of the first signed element is "Envelope", and sibling element(s) of the first signed element is "Header".

It is possible to add any additional common required accounting information between a sender and a receiver. Normally, there should be an agreement about a message structure information, which can be defined in a pre-given scheme, which is known by all the included nodes which are allowed to manipulate or to process the message to be transferred. This can be, besides the sender and the receiver, any intermediaries (such as intermediaries 204 and 206 in FIG. 4), which are provided in order to process the transferred message on its path through the network system. This message structure information is added into a header named here "SOAP Account". Before sending the message, SOAP account may be signed by the sender, resulting in a verifying signature 504 using a key derived from Alice's password.

Generation of SOAP account information neither depends on any enforcement infrastructure, nor does it incur considerable execution time. It is rather efficient in terms of execution time as SOAP account information can be computed inline while generating the corresponding SOAP message. This information can easily be attached, using, for example, existing SOAP message libraries, which makes it robust.

After receiving the message 502a from the legitimate sender, a Java class attacker, or other entity/technique acting as a malicious host, may update the message 502a following the attack patterns described above, and send the updated message 502b (shown in FIG. 5b) to the next hop. But, using the techniques described herein (e.g., validation of SOAP account information), such an attempt to attack may be detected, and thus thwarted, by a legitimate receiver of the message.

The validation of the message structure information, called here SOAP account information 505, may be done as soon as the message is received, before doing any policy validation. The receiver may calculate the SOAP account information of the received SOAP message 502b using a checking module, such as the checking module 402 of FIG. 4. For the example, of the message 502b, the calculation may result in a determination of a number of children of envelope being 2, a number of header(s) being 3 (thus invalidating a reference 506), a number of signed elements being 3, an immediate predecessor of the first signed element is "BogusHeader" 508, and a sibling element of the first signed element is "SOAP Account", "Security".

On the other hand, the obtained SOAP account information 505 as provided within the received message as 502b, as can be seen in the message 502a in FIG. 5a may be as follows: a number of children of envelope is 2, a number of header is 2, a number of signed elements is 3, an immediate predecessor of the first signed element is "Envelope", sibling elements of the first signed element is "Header".

Therefore, the receiver is able with help of its checking module to detect this mismatch and can conclude therefrom that the received SOAP message is not acceptable. In the described scenario there is a clear mismatch. Thus the change of 1000 euros to 5000 euros, as seen in lines 510a and 510b, may be detected.

In addition, if an attacker changes the SOAP account information 505, i.e. the message structure information, meeting its updated SOAP message account information then this message will be invalidated by the receiver while validating the signature of the signed SOAP account by the initial sender. Again, no substantial execution time is required here as the SOAP account information can be validated inline while reading the received message.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for providing a secure message transfer of at least one message from a sender to a receiver within a network system, the method comprising:
   computing on sender-side according to a pre-given scheme a message structure information regarding the at least one message to be sent;
   adding the computed message structure information as message account information into the at least one message to be sent;
   protecting the message account information by a signature; and
   transferring the at least one message through the network system to the receiver for validation of the message account information upon receipt of the at least one message and according to the pre-given scheme.

2. The method according to claim 1, wherein the message account information is added in a message element of the at least one message to be sent.

3. The method according to claim 2, wherein the message element is chosen as one of the elements of the group consisting of a message header and a message body.

4. The method according to claim 1, wherein the at least one message is chosen as a SOAP message.

5. The method according to claim 1, wherein computing the message structure information is performed while creating the at least one message.

6. The method according to a claim 1, wherein computing the message structure information includes determining at least one of the following items:
   a number of child elements of a root element within the at least one message,
   a number of header elements within the at least one message,
   a number of references for a signing element within the at least one message, or
   predecessor, successor and sibling relationship of a signing element.

7. The method according to claim 1, wherein the signature is realized by an encryption mechanism.

8. The method according to claim 1, wherein the at least one message is created using XML format.

9. The method according to claim 1, wherein the message transfer is based on Java.

10. A method for providing a secure message transfer of at least one message from a sender to a receiver within a network system, the method comprising:
  receiving on receiver-side the at least one message which comprises a message account information, the message account information having been computed on sender-side according to a pre-given scheme and protected by a signature, and
  validating on receiver-side the message account information after reception of the at least one message according to the pre-given scheme.

11. The method according to claim 10, wherein validating of the message account information comprises computing according to the pre-given scheme the message account information of the received message and comparing it with the obtained message account information as provided within the received message.

12. The method according to claim 11, wherein the received message is rejected if a mismatch is detected between the computed and the included message account information of the received message.

13. The method according to claim 10, wherein validating of the message account information comprises validating the signature of the message account information of the received message.

14. The method according to claim 10, wherein validating the message account information on receiver-side is done before any policy validation.

15. The method according to claim 10, wherein the at least one message can be updated by at least one intermediary which acts as receiver for the at least one message and as sender for at least one updated message.

16. A network system comprising:
  at least one of at least one sender node and at least one receiver node and enabling a secure message transfer of at least one message from the sender node to the receiver node, wherein
    the at least one sender node comprises an adding module which is configured to compute a message structure information regarding the at least one message to be sent according to a pre-given scheme, to add the computed message structure information as message account information into the at least one message and to sign the message account information by a signature before transferring the at least one message to the receiver node, and
    the receiver node comprises a checking module which is configured to validate the message account information after reception of the at least one message with respect to the pre-given scheme.

17. The system according to claim 16, comprising at least one network node including both one of said adding module and one of said checking module thus consolidating one of said sender node and one of said receiver node within one node.

18. The system according to claim 16, wherein the checking module is configured to compute according to the pre-given scheme the message account information of a received message and to compare said computed message account information with the obtained message account information as provided within the received message.

19. The system according to claim 18, wherein the receiver node is configured to conclude that the received message is not acceptable if any mismatch is detected between the computed and the included message account information of the received message and initiate automatically a specific action in case that the received message is not acceptable.

20. The system according to claim 19, wherein the action corresponds to a rejection of the message, an emission of a warning signal or a rejection of the message coupled with an emission of a warning signal.

21. The system according to claim 16, wherein the checking module is configured to validate the signature of the message account information of the received message.

22. The system according to claim 16, wherein the adding module is configured to add the message account information in a message element of the at least one message to be sent and sign said message element, wherein said message element can be chosen as one of the group consisting of a message header and a message body.

23. The system according to claim 16, wherein the receiver node of the at least one message is configured to update the at least one message thus forming at least one updated message and acting as the sender node for the at least one updated message.

24. The system according to claim 16, wherein the at least one message is chosen as a SOAP message.

25. The system according to claim 16, wherein the message structure information to be computed and to be validated includes at least one of the following items:
  a number of child elements of a root element within the at least one message,
  a number of header elements within the at least one message,
  a number of references for a signing element within the at least one message, or
  a predecessor, successor and sibling relationship of a signing element.

26. The system according to claim 16, wherein the signature can be realized by an encryption mechanism.

27. The system according to claim 16, wherein the at least one message is written in XML format.

28. A computer program product with non-transitory computer-readable medium and a computer program stored on the non-transitory computer-readable medium with a program code which, when the computer program is run on a computer, causes the computer to:
  compute on sender-side according to a pre-given scheme a message structure information regarding the at least one message to be sent;
  add the computed message structure information as message account information into the at least one message to be sent;
  protect the message account information by a signature; and
  transfer the at least one message through the network system to the receiver for validation of the message account information upon receipt of the at least one message and according to the pre-given scheme.

* * * * *